United States Patent
Kilzer et al.

(10) Patent No.: US 8,180,954 B2
(45) Date of Patent: *May 15, 2012

(54) FLASH MANAGEMENT USING LOGICAL PAGE SIZE

(75) Inventors: Kevin L Kilzer, Chandler, AZ (US); Robert W Ellis, Phoenix, AZ (US); Rudolph J Sterbenz, Chandler, AZ (US)

(73) Assignee: SMART Storage Systems, Inc., Chandler, AZ (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/424,461

(22) Filed: Apr. 15, 2009

(65) Prior Publication Data

US 2009/0259805 A1 Oct. 15, 2009

Related U.S. Application Data

(63) Continuation-in-part of application No. 12/103,277, filed on Apr. 15, 2008, which is a continuation-in-part of application No. 12/103,273, filed on Apr. 15, 2008.

(60) Provisional application No. 61/045,060, filed on Apr. 15, 2008.

(51) Int. Cl.
   *G06F 12/00* (2006.01)
(52) U.S. Cl. .......... 711/103; 711/E12.001; 711/E12.008
(58) Field of Classification Search .................. 711/103, 711/E12.001, E12.008
   See application file for complete search history.

(56) References Cited

U.S. PATENT DOCUMENTS

| | | | |
|---|---|---|---|
| 5,930,504 | A | 7/1999 | Gabel |
| 5,963,983 | A | 10/1999 | Sakakura et al. |
| 6,412,080 | B1 | 6/2002 | Fleming et al. |
| 7,107,389 | B2 | 9/2006 | Inagaki et al. |
| 7,139,864 | B2 | 11/2006 | Bennett et al. |
| 7,330,927 | B1 | 2/2008 | Reeve et al. |
| 2003/0163633 | A1 | 8/2003 | Aasheim et al. |
| 2005/0021904 | A1 | 1/2005 | Iaculo et al. |
| 2005/0038792 | A1 | 2/2005 | Johnson |
| 2006/0020745 | A1 | 1/2006 | Conley et al. |
| 2006/0069852 | A1 | 3/2006 | Aasheim et al. |
| 2006/0101219 | A1 | 5/2006 | Mita et al. |
| 2006/0106749 | A1 | 5/2006 | Ganfield et al. |
| 2006/0136682 | A1 | 6/2006 | Haridas et al. |
| 2006/0143365 | A1 | 6/2006 | Kikuchi |
| 2006/0224823 | A1 | 10/2006 | Morley et al. |
| 2006/0256624 | A1 | 11/2006 | Eggleston et al. |
| 2006/0282644 | A1 | 12/2006 | Wong |
| 2007/0005928 | A1 | 1/2007 | Trika et al. |
| 2007/0033374 | A1 | 2/2007 | Sinclair et al. |
| 2007/0198796 | A1 | 8/2007 | Warren, Jr. |
| 2007/0234004 | A1 | 10/2007 | Oshima et al. |
| 2007/0276973 | A1 | 11/2007 | Tan et al. |
| 2007/0283428 | A1 | 12/2007 | Ma et al. |

(Continued)

OTHER PUBLICATIONS

Final Office Action dated May 25, 2011 for U.S. Appl. No. 12/103,273, 14 pages.

(Continued)

*Primary Examiner* — Hoai V Ho

(57) ABSTRACT

Disclosed are techniques for flash memory management, including tracking payload data via one or more data structures configured to define the size of logical pages in a flash memory. In various embodiments, the logical page size may be larger than, equal to, or smaller than a physical page size of a flash memory chip.

16 Claims, 8 Drawing Sheets

U.S. PATENT DOCUMENTS

| | | |
|---|---|---|
| 2008/0046630 A1 | 2/2008 | Lasser |
| 2008/0077762 A1 | 3/2008 | Scott et al. |
| 2008/0133832 A1 | 6/2008 | Bhavnani |
| 2008/0177937 A1* | 7/2008 | Nishihara et al. ............ 711/103 |
| 2008/0195822 A1 | 8/2008 | Yang et al. |
| 2009/0164702 A1 | 6/2009 | Kern |
| 2010/0077136 A1 | 3/2010 | Ware et al. |

OTHER PUBLICATIONS

Final Office Action dated May 25, 2011 for U.S. Appl. No. 12/103,277 16 pages.

Non Final Office Action dated May 26, 2011 for U.S. Appl. No. 12/424,466, 17 pages.

ISR and WO dated Nov. 26, 2009 for International Application No. PCT/US2009/040713.

ISR and WO dated Dec. 1, 2009 for International Application No. PCT/US2009/040714.

ISR and WO dated Dec. 1, 2009 for International Application No. PCT/US2009/040715.

Office Action dated Oct. 21, 2010 for U.S. Appl. No. 12/103,273.

Office Action dated Nov. 10, 2010 for U.S. Appl. No. 12/103,277.

IPRP dated Sep. 14, 2010 for International Application No. PCT/US2009/040713.

IPRP dated Sep. 14, 2010 for International Application No. PCT/US2009/040714.

IPRP dated Sep. 14, 2010 for International Application No. PCT/US2009/040715.

* cited by examiner

FLASH MANAGEMENT USING LOGICAL PAGE SIZE

CROSS REFERENCE TO RELATED APPLICATIONS

This application is a non-provisional of U.S. Provisional No. 61/045,060 filed on Apr. 15, 2008 and entitled "FLASH MEMORY CONCEPTS." This application is also a continuation-in-part of U.S. Ser. No. 12/103,273 filed on Apr. 15, 2008 and entitled "FLASH MANAGEMENT USING SEQUENTIAL TECHNIQUES." This application is also a continuation-in-part of U.S. Ser. No. 12/103,277 filed on Apr. 15, 2008, now U.S. Pat. No. 8,028,123, and entitled "CIRCULAR WEAR LEVELING." The entire contents of all of the foregoing applications are hereby incorporated by reference.

TECHNICAL FIELD

The present disclosure relates to information storage, particularly storage in flash memory systems and devices.

BACKGROUND

Flash memory is a storage medium which may be erased and written electronically. It is non-volatile, and therefore maintains the information contained within it without the need for power. It typically offers improved resistance to kinetic damage compared to other storage technologies, such as magnetic disks and tapes. However, the number of write and/or erase cycles which may be performed on any particular block of flash memory is finite. Because a flash memory device holds many individual memory blocks, write and/or erase cycles are often distributed across the entire memory array in order to extend the functional lifetime of each memory block.

Techniques for distributing write and/or erase cycles across a flash memory array are commonly known as wear leveling. Nevertheless, despite the existence of various such wear leveling techniques, it remains desirable to further improve the performance of flash memory in order to realize benefits such as improved read speeds, improved write speeds, and increased flash memory functional lifetime.

SUMMARY

This disclosure relates to flash memory management wherein the size of logical pages may vary from the size of physical pages in a flash memory. In an exemplary embodiment, a method for flash memory management comprises constructing a data table associated with a flash memory. Entries of the data table correspond to logical pages within the memory, and the size of the logical pages is smaller than a size of a physical page in the memory. The data table is updated responsive to payload data being stored in at least one logical page within the flash memory. The payload data is written to the flash memory in the order it was received from a host.

In another exemplary embodiment, a data storage system comprises a memory configured for block-based erase operations, and a controller in communication with the memory. The controller is configured to write incoming data to the memory in the order the data is received. A data table is in communication with the controller. Entries of the data table correspond to logical pages within the memory, and the size of the logical pages is smaller than a size of a physical page in the memory.

In yet another exemplary embodiment, a tangible computer-readable medium has instructions stored thereon. The instructions comprise instructions to construct a data table associated with a flash memory. Entries of the data table correspond to logical pages within the memory, and the size of the logical pages is smaller than a size of a physical page in the memory. The instructions further comprise instructions to update the data table responsive to payload data being stored in at least one logical page within the flash memory. The payload data is written to the flash memory in the order it was received from a host.

The contents of this summary section are provided only as a simplified introduction to the disclosure, and are not intended to be used to interpret or limit the scope of the appended claims.

BRIEF DESCRIPTION OF THE DRAWINGS

With reference to the following description, appended claims, and accompanying drawings:

DETAILED DESCRIPTION

Figure 1:
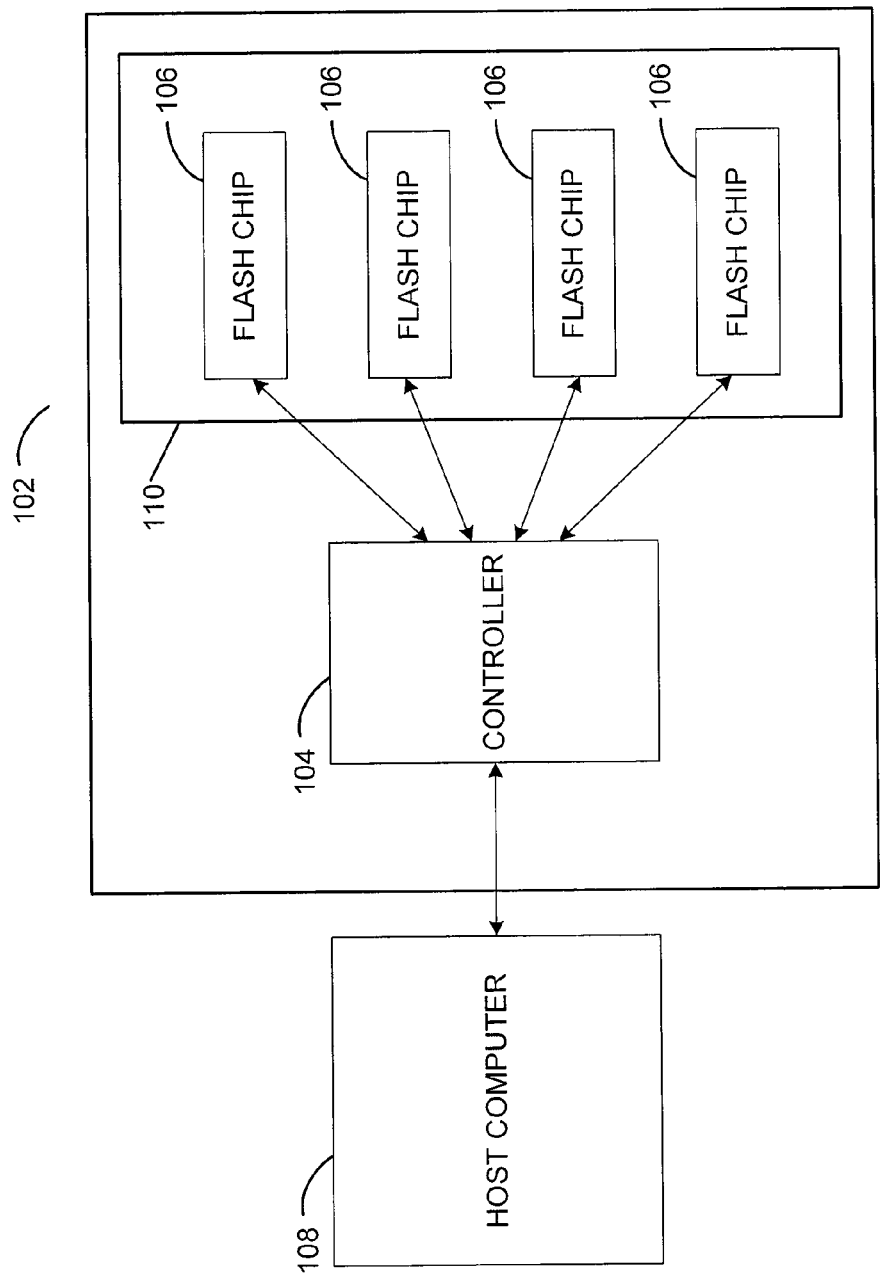
FIG. 1 represents a solid state drive and host computer system in accordance with an exemplary embodiment of the invention.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for flash management may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical flash memory management system.

For purposes of convenience, the following definitions may be used in this disclosure:

A page is a logical unit of flash memory.

An erase block is a logical unit of flash memory containing multiple pages.

Payload data is data stored and/or retrieved by a host, such as a host computer or other external data source.

Wear leveling is a process by which locations in flash memory are utilized such that the entire flash memory ages substantially uniformly, reducing localized overuse and associated failure of individual, isolated locations.

Metadata is data related to a portion of payload data (such as one page), which may provide identification information, support information, or other information to assist in managing payload data, such as to assist in determining the position of payload data within the storage context as understood by a host computer.

Prior flash memory management schemes often assume that pages within an erase block can be written in any order, and so allow payload data to be deposited non-sequentially. This simplifies the task of locating a specific block for retrieval by placing the blocks into a predefined order that allows addresses to be calculated using numerical methods instead of tabular methods, and has no bearing on the order in which blocks arrive from the host. These prior flash memory management schemes would sometimes additionally implement wear leveling techniques in order to increase the lifetime of a flash memory device. However, such flash memory management schemes often perform poorly when writing data that is substantially unsorted, fragmented, or otherwise disjoint ("random writes"). In these schemes, random write performance may be as much as two orders of magnitude slower than performance when writing substantially sorted, related, or contiguous data ("sequential writes"). In transaction-based computing systems and other high-load applications, data often comprises highly fragmented and/or random portions, rather than large, contiguous portions. As such, prior flash memory management schemes offer unsuitable performance for use in these areas, because the vast majority of write operations are random writes.

In contrast, in accordance with an exemplary aspect of the present invention, flash memory management is improved by writing payload data to a particular flash memory device in the order in which it was received, and/or in sequential order within an erase block. Thus, in essence, sequences of random data are written in the same manner as sequences of contiguous data. Such an approach can vastly improve random write performance, with minimal impact on sequential write performance. A flash memory device, such as a solid state drive, configured to achieve improved random write performance can better suit the needs of, for example, applications in the small block size enterprise storage market, such as database and database-like programs, and other applications which make frequent, small accesses to data storage. Moreover, sequential writing can improve flash memory management by reducing and/or eliminating various flash write issues, for example trapped charge relaxation errors due to writing too fast, disturb errors due to multiple write cycles to a single page, disturb errors due to imbalanced utilization of a particular erase block, and the like.

By writing incoming payload data in the order in which it was received, the time order of the incoming payload data is preserved. Further, such an approach can eliminate position dependence of payload data within an erase block. Stated another way, because incoming payload data is written in the order it was received, there may be no ordinal relationship among pages of payload data stored within an erase block. In particular, payload data stored within an erase block may be entirely disjoint, with each page of payload data having no relationship to any other page of payload data.

Further, certain modern flash memory devices (for example, Intel SD58 series NAND flash memory) impose the restriction that pages within an erase block must be written in sequential order. However, prior flash memory management systems comprising these flash memory devices did not write incoming data directly to the flash memory device in the order in which it was received. Rather, these prior systems may have held incoming data in a buffer until a full erase block of related data was received, and then wrote the entire erase block of related data to the flash memory device at once (i.e. these prior systems wrote sequences of contiguous data differently than sequences of random data). When operating within the constraints presented by such devices, and in accordance with an exemplary aspect of the present invention, a flash memory management system realizes improvements in data integrity by writing sequences of random data in the same manner as sequences of contiguous data. However, the principles of the present invention may be applied to all flash memory, and are not limited to flash memory which imposes the restriction that pages within an erase block must be written in sequential order. Additionally, the principles of the present invention may be applied to any storage technology which requires data to be erased on a blockwise basis.

With reference to FIG. 1, FIG. 2, FIG. 3A, FIG. 3B, and FIG. 4, in accordance with an exemplary embodiment, a flash memory management system 100 comprises a solid state drive 102. Solid state drive 102 may be coupled to a host computer 108. Solid state drive 102 comprises a flash chip array 110 and a flash chip controller 104. Flash chips 106 in flash chip array 110 are divided into erase blocks 312, and erase blocks 312 are divided into pages 314. One or more data structures, such as data tables 408, to support solid state drive 102 are constructed in RAM 402 of sequence and control machine 210.

Returning now to FIG. 1, in accordance with an exemplary embodiment, a solid state drive 102 is a storage medium capable of storing electronic information in a persistent form, typically in computer chips or other solid-state devices. In an exemplary embodiment, solid state drive 102 comprises a thumb drive. In other exemplary embodiments, solid state drive 102 comprises a storage medium in a desktop computer, a laptop computer, a smartphone, or a personal digital assistant. Solid state drive 102 can be used in place of magnetic disk drives or certain other magnetic, optical, or electronic storage components in computing systems. Solid state drive 102 can provide significant advantages when compared to magnetic or optical storage, such as faster seek times, faster access times, improved ruggedness and reliability, lower operating noise, and lower power consumption. Depending on the configuration and components of a particular solid state drive 102, it may be compatible with computer storage interface protocols, including but not limited to Serial Advanced Technology Attachment (SATA), Parallel Advanced Technology Attachment (PATA), Small Computer System Interface (SCSI), IEEE 1394 (Firewire), Serial Attached SCSI (SAS), and Universal Serial Bus (USB). Further, solid state drive 102 may be configured to conform with standard storage form factors, such as "5.25 inch", "3.5 inch" (commonly used in desktop storage products), and "2.5 inch" (commonly used in mobile computing products).

A flash chip array, such as flash chip array 110, comprises one or more flash chips 106. Any number of flash chips may be selected. In one exemplary embodiment, a flash chip array 110 comprises sixteen flash chips. In various exemplary embodiments, other suitable numbers of flash chips 106 may be selected, such as one, two, four, eight, or thirty-two flash chips. Flash chips 106 may be selected to meet storage size, power draw, or other desired flash chip array characteristics.

In an exemplary embodiment, flash chip array 110 comprises flash chips 106 having similar storage sizes. In various other exemplary embodiments, flash chip array 110 comprises flash chips 106 having different storage sizes. Any number of flash chips 106 having various storage sizes may be selected. Further, a number of flash chips 106 having a significant number of unusable erase blocks 312 and/or pages 314 may comprise flash chip array 110. In this manner, one or more flash chips 106 which may have been unsuitable for use in a particular solid state drive 102 can now be utilized. For example, a particular flash chip 106 may contain 2 gigabytes of storage capacity. However, due to manufacturing processes or other factors, 1 gigabyte of the storage capacity on this particular flash chip 106 may be unreliable or otherwise unusable. Similarly, another flash chip 106 may contain 4 gigabytes of storage capacity, of which 512 megabytes are unusable. These two flash chips 106 may be included in a flash chip array 110. In this example, flash chip array 110 contains 6 gigabytes of storage capacity, of which 4.5 gigabytes are usable. Thus, the total storage capacity of flash chip array 110 may be reported as any size up to and including 4.5 gigabytes. In this manner, the cost of solid state drive 102 may be reduced, as flash chips 106 with higher defect densities are often less expensive. Moreover, because flash chip array 110 may utilize various types and sizes of flash memory, one or more flash chips 106 may be utilized instead of discarded as waste.

In an exemplary embodiment, the reported storage capacity of flash chip array 110 may be smaller than the actual storage capacity, for such reasons as to compensate for the development of bad blocks, provide space for defragmentation operations, provide space for index information, extend the useable lifetime of flash chip array 110, and the like. For example, flash chip array 110 may comprise flash chips 106 having a total useable storage capacity of 10 gigabytes. However, the reported capacity of flash chip array 110 may be 2 gigabytes. Thus, because no more than 2 gigabytes of space within flash chip array 110 will be utilized for active storage, individual memory elements in flash chip array 110 may be utilized in a reduced manner, and the useable lifetime of flash chip array 110 may be extended. In the present example, when the reported capacity of flash chip array 110 is 2 gigabytes, the useable lifetime of a flash chip array 110 with useable storage capacity of ten gigabytes would be about five times longer than the useable lifetime of a flash chip array 110 containing only 2 gigabytes of total useable storage capacity, because the reported storage capacity is the same but the actual capacity is five times larger.

In various embodiments, flash chip array 110 comprises multiple flash chips 106. As disclosed hereinbelow, each flash chip 106 may have one or more bad pages 314 which are not suitable for storing data. However, solid state drive 102 may be configured in a manner which allows all good pages 314 within each flash chip 106 to be utilized.

Flash chips 106 may be mounted on a printed circuit board. Flash chips 106 may also be mounted in other suitable configurations in order to facilitate their use in forming flash chip array 110.

In an exemplary embodiment, flash chip array 110 is configured to interface with flash controller 104. Flash controller 104 is configured to facilitate reading, writing, erasing, and other operations on flash chips 106. Flash controller 104 may be configured in any suitable manner to facilitate operations on flash chips 106 in flash chip array 110.

In flash chip array 110, and according to an exemplary embodiment, individual flash chips 106 are configured to receive a chip select (CS) signal. A CS signal is configured to locate, address, and/or activate a flash chip 106. For example, in a flash chip array 110 with eight flash chips 106, a three-bit binary CS signal would be sufficient to uniquely identify each individual flash chip 106. In an exemplary embodiment, CS signals are sent to flash chips 106 from flash controller 104. In another exemplary embodiment, discrete CS signals are decoded within flash controller 104 from a three-bit CS value and applied individually to each of the flash chips 106.

In an exemplary embodiment, multiple flash chips 106 in flash chip array 110 may be accessed simultaneously. Simultaneous access can facilitate performance gains, such as improvements in responsiveness and throughput of flash chip array 110. For example, flash chips 106 are typically accessed through an interface, such as an 8-bit bus interface. If two identical flash chips 106 are provided, these flash chips 106 may be logically connected such that an operation (read, write, erase, and the like) performed on the first flash chip 106 is also performed on the second flash chip 106, utilizing identical commands and addressing. Thus, data transfers happen in tandem, effectively doubling the effective data rate without increasing data transfer latency. However, in this configuration, the logical page size and/or logical erase block size may also double. Moreover, any number of similar and/or different flash chips 106 may comprise flash chip array 110, and flash controller 104 may utilize flash chips 106 within flash chip array 110 in any suitable manner in order to achieve one or more desired performance and/or configuration objectives (e.g., storage size, data throughput, data redundancy, flash chip lifetime, read time, write time, erase time, and the like).

A flash chip, such as flash chip 106, may be an integrated circuit fabricated on a single piece of silicon or other suitable substrate. Alternatively, flash chip 106 may comprise integrated circuits fabricated on multiple substrates. One or more flash chips 106 may be packaged together in a standard package such as a thin small outline package, ball grid array, stacked package, land grid array, quad flat package, or other suitable package, such as standard packages approved by the Joint Electron Device Engineering Council (JEDEC). A flash chip 106 may also conform to specifications promulgated by the Open NAND Flash Interface Working Group (OFNI). A flash chip 106 can be fabricated and packaged in any suitable manner for inclusion in a flash chip array 110.

Flash chip 106 may contain any number of non-volatile memory elements, such as NAND flash elements, NOR flash elements, and the like. Flash chip 106 may also contain control circuitry. Control circuitry can facilitate reading, writing, erasing, and other operations on non-volatile memory elements. Such control circuitry may comprise elements such as microprocessors, registers, buffers, counters, timers, error correction circuitry, and input/output circuitry. Such control circuitry may also be located external to flash chip 106.

Figures 3A, 3B:
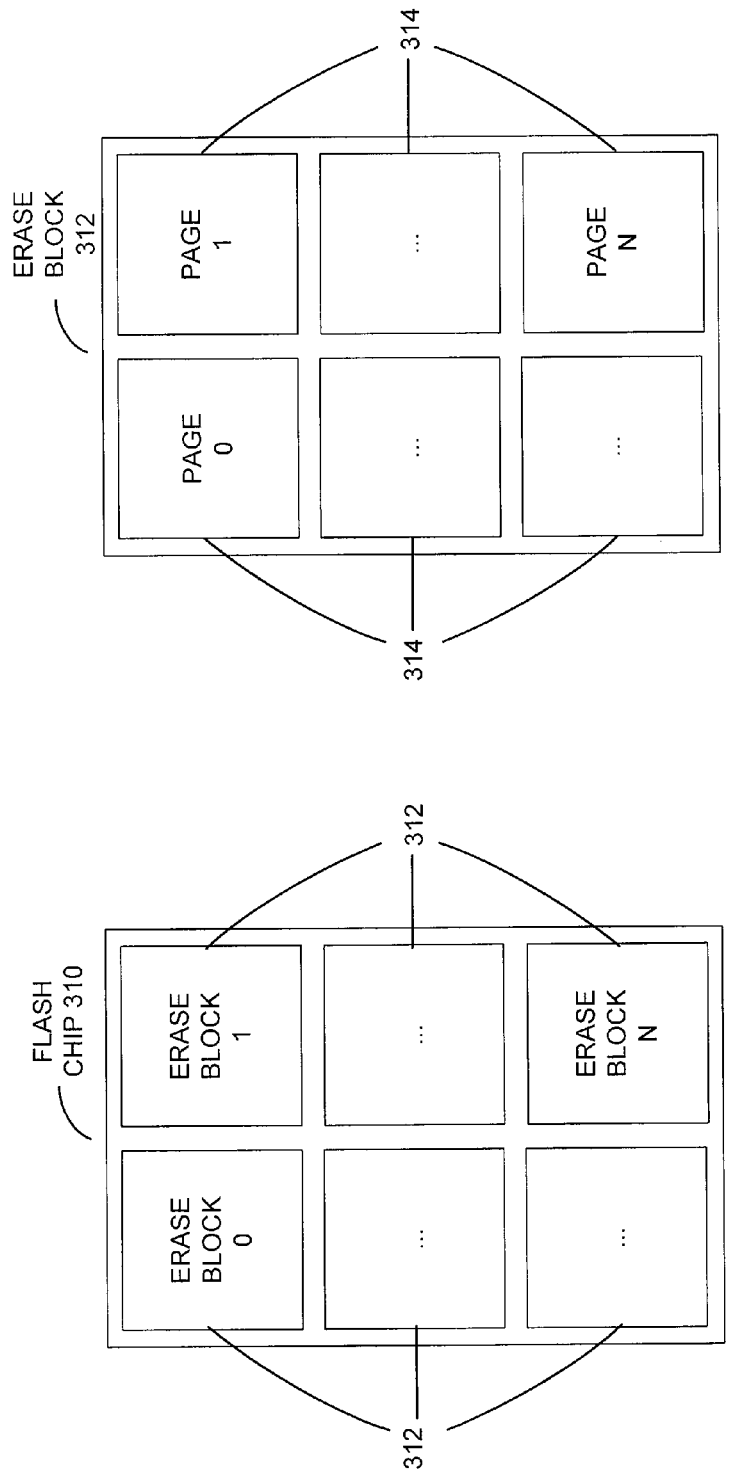
FIG. 3A represents a flash chip containing erase blocks in accordance with an exemplary embodiment of the invention.
FIG. 3B represents an erase block containing pages in accordance with an exemplary embodiment of the invention.

In an exemplary embodiment, non-volatile memory elements on flash chip 106 are configured as a number of erase blocks 0 to N. With reference to FIG. 3A and FIG. 3B, a flash chip 106, such as flash chip 310, comprises one or more erase blocks 312. Each erase block 312 comprises one or more pages 314. Each page 314 comprises a subset of the non-volatile memory elements within an erase block 312. Each erase block 312 contains about 1/N of the non-volatile memory elements located on flash chip 310.

In general, because flash memory, particularly NAND flash memory, may often be erased only in certain discrete sizes at a time, flash chip 310 typically contains a large number of erase blocks 312. Such an approach allows operations on a particular erase block 312, such as erase operations, to be conducted without disturbing data located in other erase blocks 312. Alternatively, were flash chip 310 to contain only a small number of erase blocks 312, data to be erased and data to be preserved would be more likely to be located within the same erase block 312. In the extreme example where flash chip 310 contains only a single erase block 312, any erase operation on any data contained in flash chip 310 would require erasing the entire flash chip 310. If any data on flash chip 310 was desired to be preserved, that data would need to be read out before the erase operation, stored in a temporary location, and then re-written to flash chip 310. Such an approach has significant overhead, and could lead to premature failure of the flash memory due to excessive, unnecessary read/write cycles.

With continued reference to FIG. 3A and FIG. 3B, an erase block 312 comprises a subset of the non-volatile memory elements located on flash chip 310. Although memory elements within erase block 312 may be programmed and read in smaller groups, all memory elements within erase block 312 may only be erased together. Each erase block 312 is further subdivided into any suitable number of pages 314. A flash chip array 110 may be configured to comprise flash chips 310 containing any suitable number of pages 314.

A page 314 comprises a subset of the non-volatile memory elements located within an erase block 312. In an exemplary embodiment, there are 64 pages 314 per erase block 312. To form flash chip array 110, flash chips 106 comprising any suitable number of pages 314 per erase block 312 may be selected.

In addition to memory elements used to store payload data, a page 314 may have memory elements configured to store error detection information, error correction information, and/or other information intended to ensure safe and reliable storage of payload data. Further, the error detection information, the error correction information, and other information can be stored in the erase block 312 different from the erase block 312 for storing the payload data. In an exemplary embodiment, metadata stored in a page 314 is protected by error correction codes. In various exemplary embodiments, a portion of erase block 312 is protected by error correction codes. This portion may be smaller than, equal to, or larger than one page.

In an exemplary embodiment, erase block 312 comprises 64 pages 314. Of these pages, 63 are configured to store payload data, such as data received from an external source, such as host computer 108. The final page is configured to contain erase block index information. Furthermore, any number of pages in erase block 312 may be used to store payload data and/or erase block index information. In an exemplary embodiment, erase block index information stored in the final page comprises a duplicate copy of metadata associated with each page 314 configured to store payload data. Additionally, index information for a particular erase block 312 may be stored in the final page of a different erase block 312. For example, index information for a particular erase block 312 located on a flash chip 106 may be stored in an erase block 312 located on a different flash chip 106. Erase block index information may be stored in any suitable location configured to store index information. Multiple copies of erase block index information for a particular erase block 312 may be stored at various locations in flash chip array 110.

Moreover, metadata, such as erase block index information, error correcting codes, and the like, may be stored in any suitable nonvolatile location, for example outside flash chip array 110. Moreover, a separately addressable flash chip 106, or one or more non-flash memory elements may be utilized in combination with one or more flash chips 106 to achieve improved performance. For example, NAND flash memory devices, such as those from Intel and Samsung, are often designed to be acceptable for use in a wide variety of applications at a low cost. Thus, these flash memory devices are configured based on design guidelines and/or assumptions or best guesses as to market requirements. Thus, these flash memory devices are often sized to accommodate four or eight disk blocks of 512 bytes each, plus a number of additional bytes for error correction codes, other metadata, and other implementation-specific data elements. The number of additional bytes provided may vary (for example, many Samsung devices provide 128 additional bytes per 4 kB stored, many Intel devices provide 218 additional bytes per 4 kB, stored, and so on). While these additional bytes may be sufficient to store the desired error correction codes for up to eight logical blocks as defined by the InterNational Committee for Information Technology Standards (INCITS) committee T13 (ATA standards group) and committee T10 (SCSI standard group), storage of information beyond basic error correction codes and basic metadata may be desired. Moreover, if the logical block address size is varied, additional storage space may be needed. Because the number of vendors providing flash memory with extended additional storage bytes may be limited, other solutions for storing error correcting codes and/or metadata are desirable.

In certain embodiments, an additional non-volatile storage device is provided. This additional non-volatile storage device is configured to store error correcting codes and/or metadata for flash chip array 110. The additional non-volatile storage may be coupled to flash controller 104. Due to the comparatively small storage size of the error correcting codes and/or metadata associated with flash chip array 110, alternative memory technologies other than flash memory may be desirably employed for the additional non-volatile storage. For example, magnetic RAM (MRAM), ferromagnetic RAM (FRAM), phase-change memory (PC-RAM), or other suitable RAM, may be utilized. Moreover, these technologies may provide true random read and/or write operations, and may be capable of writing single bits to either state without an erase requirement.

In an exemplary embodiment, the additional non-volatile storage device provides 256 bytes of storage for error correcting codes and/or metadata per 4 kB of storage in flash chip array 110. Thus, if the storage capacity of flash chip array 110 is 256 GB, the storage capacity of the additional non-volatile storage device may be 16 GB. In this manner, performance of solid state drive 102 may be improved, as error correcting information, metadata, and the like, for information stored in flash chip array 110, may be written and/or retrieved at a higher rate of speed as compared to operations within flash chip array 110. Moreover, information stored in the additional non-volatile storage device may be accessed in random fashion and/or without need to simultaneously access flash chip array 110.

Returning now to FIG. 4 and in an exemplary embodiment, index information is used to construct or reconstruct one or more data structures. For example, an erase block table, such as a physical erase block (PEB) table 406, and/or a page table, such as a logical to physical (L2P) table 404, can be created in RAM 402 in sequence and control machine 210. Index information for an erase block 312 may be constructed, stored, or otherwise held in RAM 402 in sequence and control machine 210. In accordance with an exemplary embodiment, index information for an erase block 312 is written to final page 314 when all other pages 314 within erase block 312 have been filled with payload data. Index information for an erase block 312 may also be written to final page 314 when a write operation to erase block 312 is completed, even though all other pages within erase block 314 may not yet be filled with payload data. Index information for an erase block 312 may be written to final page 314 at any time in order to provide an accurate record of the contents and status of erase block 312. Moreover, index information for a particular erase block 312 may also comprise an indication of which pages 314 within erase block 312 are damaged or otherwise unusable.

When an erase block 312 contains no valid payload data, it is ready to be erased. The index information for this erase block 312 may be marked as obsolete. An erase block 312 may be erased at any appropriate time.

Figure 2:
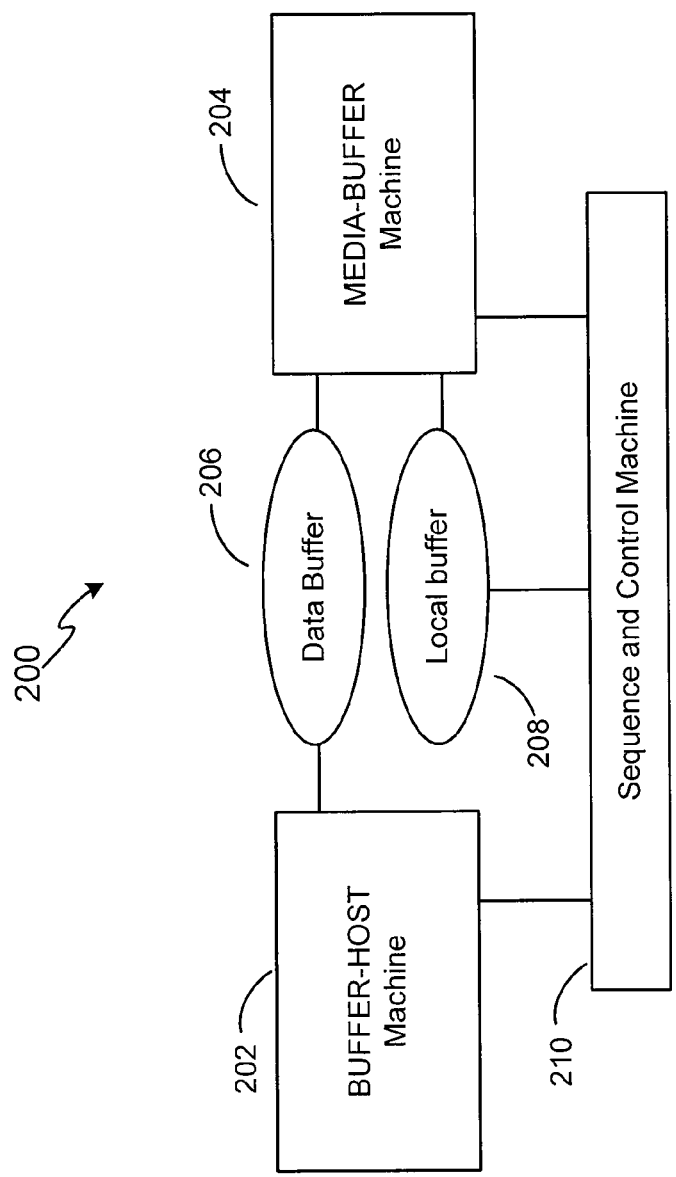
FIG. 2 discloses a flash controller in accordance with an exemplary embodiment of the invention.

Turning now to FIG. 2, a flash controller 104, such as flash controller 200, may comprise any suitable circuitry configured to interface with flash chips 106 and with host computer 108. For example, flash controller 200 may be implemented on a field programmable gate array (FPGA). In another example, flash controller 200 may be implemented on an application specific integrated circuit (ASIC). Further, flash controller 200 may be implemented on any suitable hardware. In accordance with an exemplary embodiment, flash controller 200 comprises a buffer-host machine 202, a media-buffer machine 204, a data buffer 206, a local buffer 208, and a sequence and control machine 210. Flash controller 200 is configured to communicate with host computer 108 and with flash chips 106.

Buffer-host machine 202 may comprise any suitable circuitry configured to provide an interface between data buffer 206 and an external data source, such as host computer 108. In an exemplary embodiment, buffer-host machine 202 is configured to interface with host computer 108. Buffer-host machine 202 is further configured to control the flow of payload data between host computer 108 and data buffer 206. Buffer-host machine 202 is configured to receive and optionally queue commands from host computer 108. Any errors resulting from these commands are returned to host computer 108 on behalf of sequence and control machine 210. In particular, commands that do not involve the transfer of payload data are not applied to sequence and control machine 210, but instead are handled directly by buffer-host machine 202.

In an exemplary embodiment, for a solid state drive 102 configured as an ATA drive replacement, such non-payload commands comprise ATA commands, such as the ATA IDENTIFY and ATA SET FEATURES commands. In an exemplary embodiment, buffer-host machine 202 is configured to have logical block address level visibility into data buffer 206. Such a configuration allows buffer-host machine 202 to reduce latency. Further, it allows buffer-host machine 202 to manage data transfers which are less than one page in size.

Data buffer 206 may comprise any suitable circuitry configured to connect media-buffer machine 204 and buffer-host machine 202. In an exemplary embodiment, data buffer 206 is a page-sized buffer. In other embodiments, data buffer 206 may be larger than one page. Data buffer 206 may be any size suitable to be configured to connect media-buffer machine 204 and buffer-host machine 202. In an exemplary embodiment, data buffer 206 is configured to hold data as a short-time cache (for example, for less-than-page sized operations). In various exemplary embodiments, data buffer 206 is configured as a first-in-first-out (FIFO) buffer. In other exemplary embodiments, data buffer 206 is configured in any suitable manner to connect media-buffer machine 204 and buffer-host machine 202. Further, data buffer 206 may be configured to transfer data between host-buffer machine 202 and media-buffer machine 204.

Media-buffer machine 204 may comprise any suitable circuitry configured to provide an interface between data buffer 206 and flash chip array 110. In an exemplary embodiment, media-buffer machine 204 is configured to communicate with and control one or more flash chips 106. In various exemplary embodiments, media-buffer machine 204 is configured to provide error correction code generation and checking capabilities.

Local buffer 208 is a buffer configured to capture local data. In an exemplary embodiment, local buffer 208 can capture error correction data.

Sequence and control machine 210 may comprise any suitable circuitry configured to receive payload data processing commands from buffer-host machine 202, and configured to implement the logic and computational processes necessary to carry out and respond to these commands. In an exemplary embodiment, sequence and control machine 210 is configured to create, access, and otherwise manage data structures, such as data tables 408. Further, sequence and control machine 210 is configured to coordinate buffer-host machine 202, data buffer 206, local buffer 208, and media-buffer machine 204 in order to implement tasks, for example read, write, garbage collection, and/or the like.

Turning again to FIG. 4, in accordance with an exemplary embodiment, one or more data structures, such as data tables 408, are maintained in random access memory (RAM) of sequence and control machine 210, such as RAM 402. Data tables 408 are configured to facilitate read, write, erase, and other operations on flash chip array 110 in solid state drive 102.

According to an exemplary embodiment, data tables 408 are stored in their entirety in RAM 402 of sequence and control machine 210. In this exemplary embodiment, no portion of data tables 408 is stored on a hard disk drive, solid state drive, magnetic tape, or other non-volatile medium. Prior approaches were unable to store data tables 408 in their entirety in RAM 402 due to the limited availability of space in RAM 402. But now, large amounts of RAM 402, such as 1 gigabyte, 4 gigabytes, or more, are relatively inexpensive and are now commonly available for use in sequence and control machine 210. Because data tables 408 are stored in their entirety in RAM 402, which may be quickly accessed, system speed can be increased when compared to former approaches which stored only a small portion of a data table in RAM 402, and stored the remainder of a data table on a slower, nonvolatile medium. In other exemplary embodiments, portions of data tables 408, such as infrequently accessed portions, are strategically stored in non-volatile memory. Such an approach balances the performance improvements realized by keeping data tables 408 in RAM 402 with the potential need to free up portions of RAM 402 for other uses.

Figure 4:
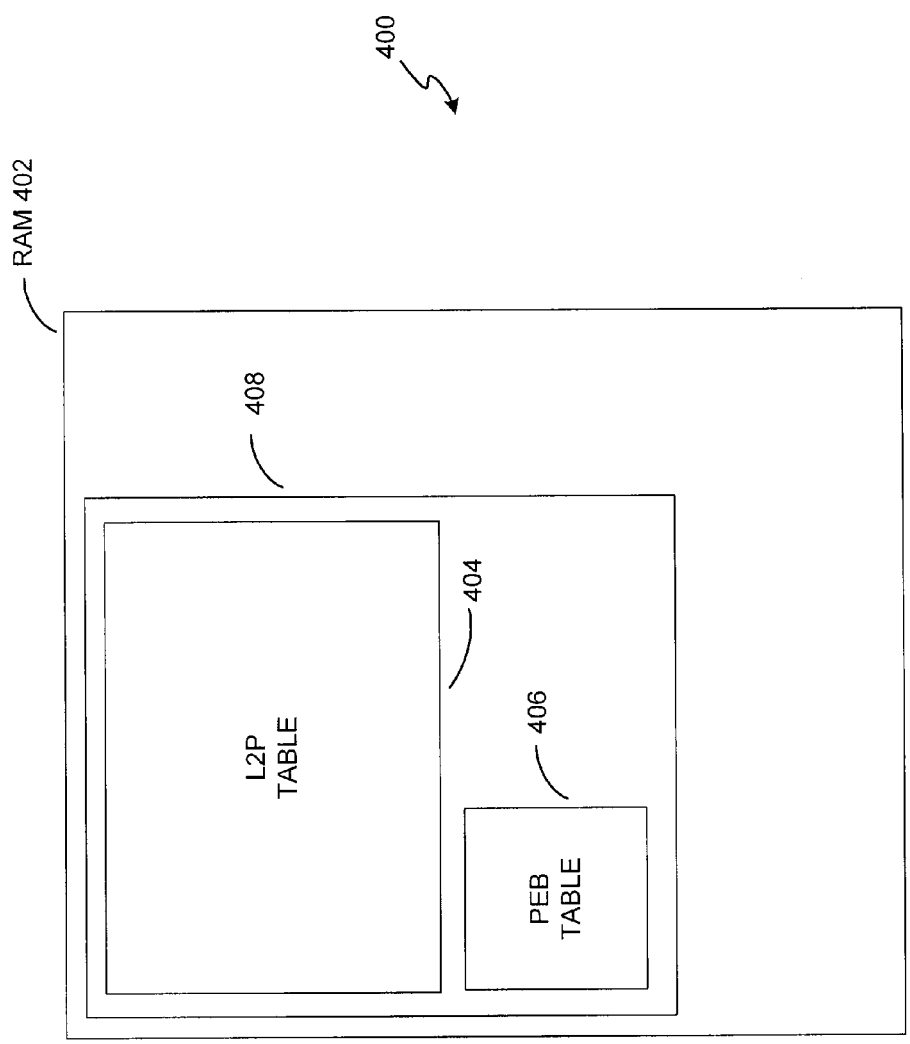
FIG. 4 illustrates data structures in accordance with an exemplary embodiment of the invention.

With continued reference to FIG. 4, in an exemplary embodiment, a logical page is mapped to a particular area of physical non-volatile memory on a flash chip 106 by use of a table, such as a logical to physical (L2P) table 404. Entries in L2P table 404 contain physical addresses for logical memory pages. Entries in L2P table 404 may also contain additional information about the page in question. The size of L2P table 404 defines the apparent capacity of solid state drive 102.

L2P table 404 contains information configured to map a logical page to a logical erase block and page. For example, in an exemplary embodiment, in L2P table 404 an entry contains 22 bits: an erase block number (16 bits), and a page offset number (6 bits). With reference to FIG. 3A and FIG. 3B, the erase block number identifies a specific logical erase block 312 in solid state drive 102, and the page offset number identifies a specific page 314 within erase block 312. The number of bits used for the erase block number, and the page offset number may be increased or decreased depending on the number of flash chips 106, erase blocks 312, and/or pages 314 desired to be indexed.

With continued reference to FIG. 3A, FIG. 3B, and FIG. 4, erase blocks 312 in a solid state drive 102 may be managed via a table, such as a physical erase block (PEB) table 406. PEB table 406 may be configured to contain any suitable information about erase blocks 312. In an exemplary embodiment, PEB table 406 contains information configured to locate erase blocks 312 in flash chip array 110.

In an exemplary embodiment, PEB table 406 is located in its entirety in RAM 402 of sequence and control machine 210. Further, PEB table 406 is configured to store information about each erase block 312 in flash chip array 110, such as the flash chip 106 where erase block 312 is located (i.e. a chip select (CS) value), the location of erase block 312 on flash chip 106, the state (e.g. dirty, erased, and the like) of pages 314 in erase block 312, the number of pages 314 in erase block 312 which currently hold payload data, the next page 314 within erase block 312 available for writing incoming payload data, information regarding the wear status of erase block 312, and the like. Further, pages 314 within erase block 312 may be tracked, such that when a particular page is deemed unusable, the remaining pages in erase block 312 may still be used, rather than marking the entire erase block 312 containing the unusable page as unusable.

Additionally, the size and/or contents of PEB table 406 and/or other data structures 408 may be varied in order to allow tracking and management of operations on portions of erase block 312 smaller than one page in size. Prior approaches typically tracked a logical page size which was equal to the physical page size of the flash memory device in question. In contrast, because an increase in a physical page size often imposes additional data transfer latency or other undesirable effects, in various exemplary embodiments, a logical page size smaller than a physical page size is utilized. In this manner, data transfer latency associated with solid state drive 102 may be reduced. For example, when a logical page size LPS is equal to a physical page size PPS, the number of entries in PEB table 406 may be a value X. By doubling the number of entries in PEB table 406 to 2X, twice as many logical pages may be managed. Thus, logical page size LPS may now be half as large as physical page size PPS. Stated another way, two logical pages may now correspond to one physical page. Similarly, in an exemplary embodiment, the number of entries in PEB table 406 is varied such that any desired number of logical pages may correspond to one physical page.

Moreover, the size of a physical page in a first flash chip 106 may be different than the size of a physical page in a second flash chip 106. Thus, in various exemplary embodiments, PEB table 406 may be configured to manage a first number of logical pages per physical page for first flash chip 106, a second number of logical pages per physical page for second flash chip 106, and so on. In this manner, multiple flash chips 106 of various capacities and/or configurations may be utilized within solid state drive 102.

Additionally, a flash chip 106 may comprise one or more erase blocks 312 containing at least one page that is "bad", i.e. defective or otherwise unreliable and/or inoperative. In previous approaches, when a bad page was discovered, the entire erase block 312 containing a bad page was marked as unusable, preventing other "good" pages within that erase block 312 from being utilized. To avoid this condition, in various exemplary embodiments, PEB table 406 and/or other data tables 408, such as a defect list, may be configured to allow use of good pages within an erase block 312 having one or more bad pages. For example, PEB table 406 may comprise a series of "good/bad" indicators for one or more pages. Such indicators may comprise a status bit for each page. If information in PEB table 406 indicates a particular page is good, that page may be written, read, and/or erased as normal. Alternatively, if information in PEB table 406 indicates a particular page is bad, that page may be blocked from use. Stated another way, sequence and control machine 210 may be prevented from writing to and/or reading from a bad page. In this manner, good pages within flash chip 106 may be more effectively utilized, extending the lifetime of flash chip 106.

In addition to L2P table 404 and PEB table 406, other data structures, such as data tables 408, may be configured to manage the contents of flash chip array 110. In an exemplary embodiment, L2P table 404, PEB table 406, and all other data tables 408 are located in their entirety in RAM 402 of sequence and control machine 210. In other exemplary embodiments, L2P table 404, PEB table 406, and all other data tables 408 are located in any suitable location configured for storing data structures.

In an exemplary embodiment, data structures, such as data tables 408, are constructed using erase block index information stored in the final page of each erase block 312. Data tables 408 are constructed when solid state drive 102 is powered on. In another exemplary embodiment, data tables 408 are constructed using the metadata associated with each page 314 in flash chip array 110. Again, data tables 408 are constructed when solid state drive 102 is powered on. Data tables 408 may be constructed, updated, modified, and/or revised at any appropriate time to enable operation of solid state drive 102.

Figure 5:
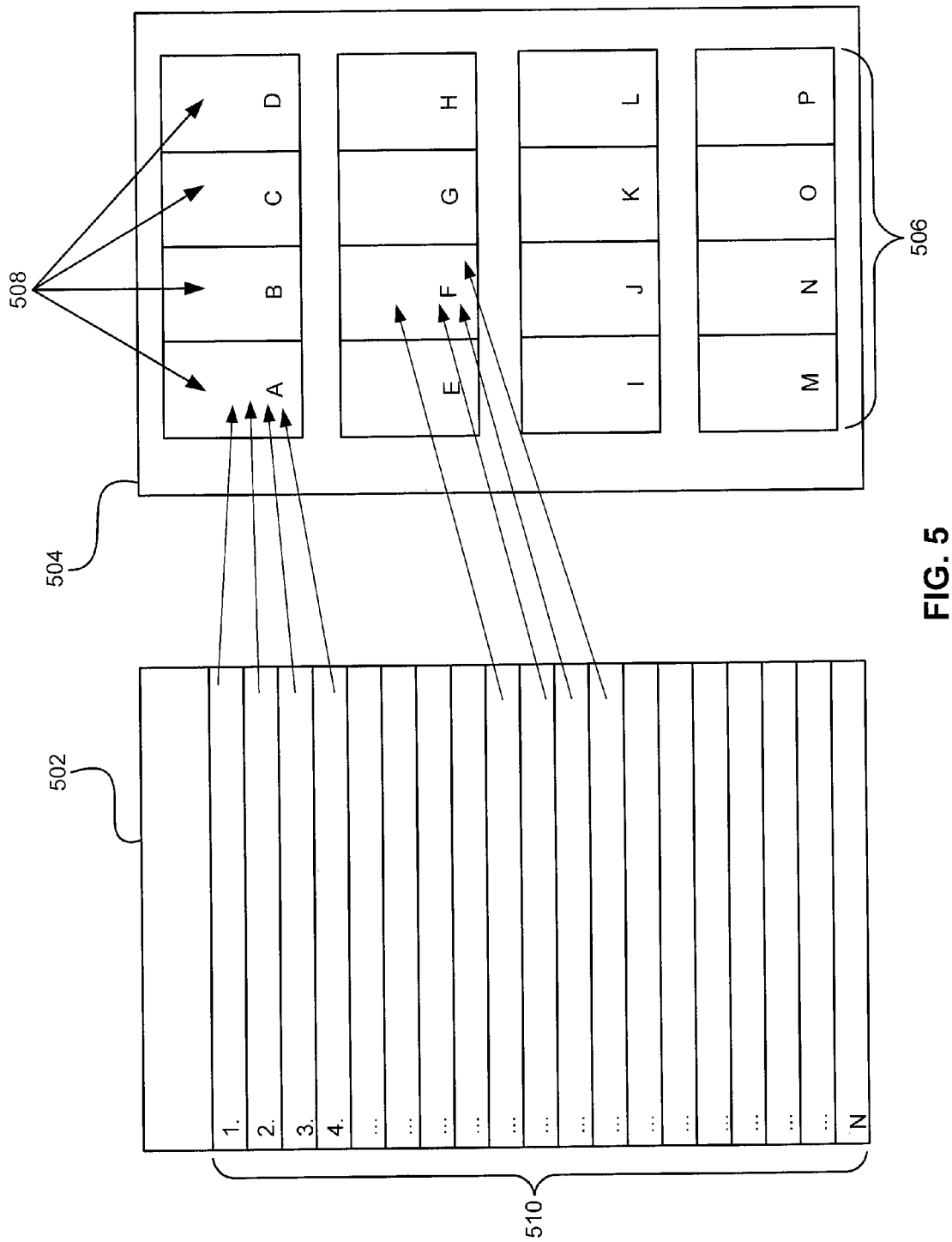
FIGS. 5 through 8 illustrate flash memory management utilizing a logical page size smaller than a physical page size in accordance with an exemplary embodiment of the invention.

In various exemplary embodiments, a logical page size may be equal to, larger than, and/or smaller than a physical page size. In particular, a logical page size smaller than a physical page size enables finer data tracking granularity, and can reduce data transfer latency, because smaller data transfers are typically faster. With reference now to FIG. 5, in an exemplary embodiment, a PEB table 406 (for example, PEB table 502) comprises a set of entries 510 numbered 1 through N associated with physical pages 314 (for example, physical pages 508) within one or more erase blocks 312 (for example, erase blocks 506) located on a flash chip 106 (for example, flash chip 504). In this embodiment, PEB table 502 comprises four entries 510 per physical page 508. Entries 510 1 through 4 in PEB table 502 are associated with physical page 508 marked "A". Four other entries 510 in PEB table 502 are associated with physical page 508 marked "F", and so on. In this manner, PEB table 502 may track up to four logical pages per physical page 508. For ease of illustration in FIG. 5, entries 510 in PEB table 502 associated with a particular page 508 are shown as adjacent to one another. However, PEB table 502 may be configured in any suitable manner, and entries 510 in PEB table 502 may be located in any suitable arrangement, to enable tracking of logical pages of a desired size within one or more flash chips 504.

Figure 6:
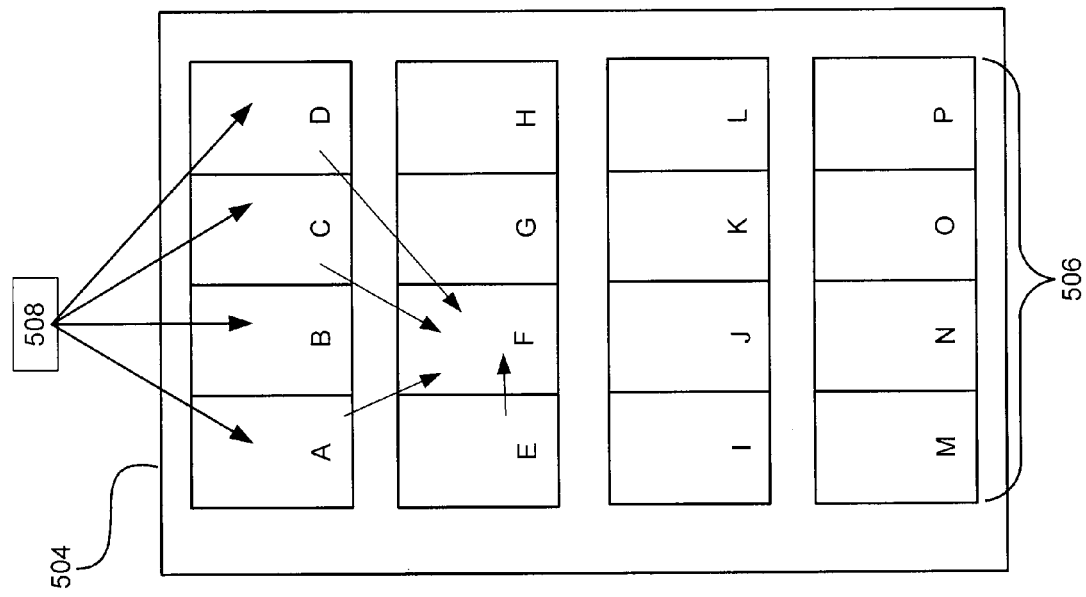
Figure 6:
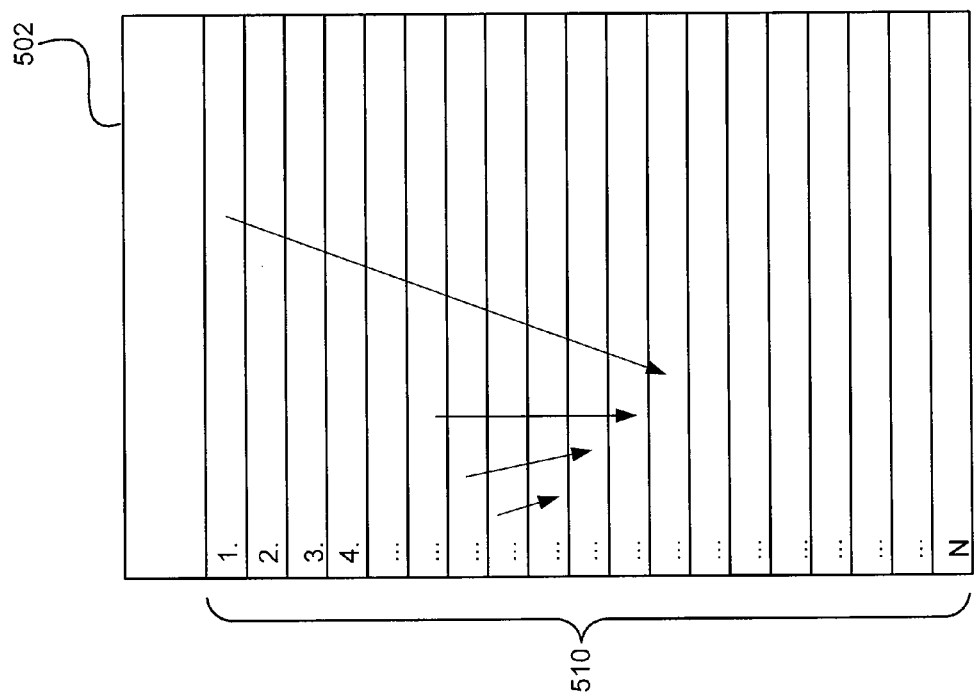

Turning now to FIG. 6, in an exemplary embodiment, payload data located in various logical pages within multiple physical pages 508 may be consolidated, copied, and/or otherwise moved into one physical page 508. As illustrated, certain payload data from physical pages 508 A, C, D, and E is moved into physical page 508 F. Corresponding entries 510 within PEB table 502 are updated to reflect the new location of the payload data which was moved. Stated another way, four entries 510 are updated to indicate that the corresponding payload data is now located within physical page 508 F.

Figure 7:
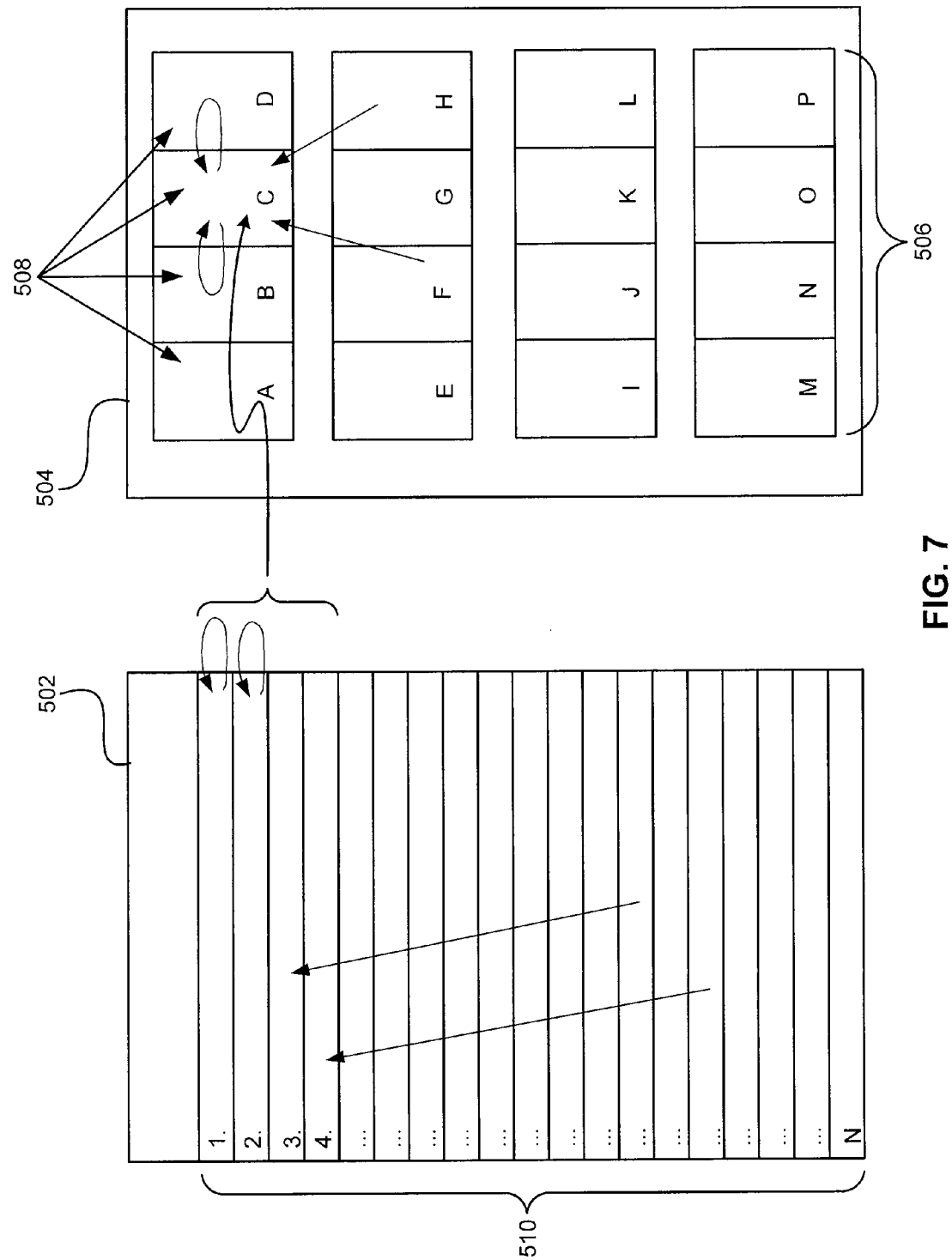

Moreover, as illustrated in FIG. 7, in an exemplary embodiment, payload data associated with a particular logical page may be consolidated, copied, or otherwise moved into a particular physical page 508 without disturbing the contents of other logical pages within physical page 508. For example, the contents of a logical page within physical page 508 F and a logical page within physical page 508H are moved to physical page 508 C. As illustrated, four logical pages are present within physical page 508 C; thus, two logical pages within physical page 508 C are updated, and two are unchanged. Corresponding entries 510 within PEB table 502 are updated to reflect the new location of the payload data which was moved. While self-referential arrows are provided in FIG. 7 to illustrate payload data and corresponding entries 510 within PEB 502 which have not changed, it is understood that payload data may be temporarily moved to a buffer location and then re-written to the original location, for example if necessitated by other data operations associated with a particular physical page 508.

Figure 8:
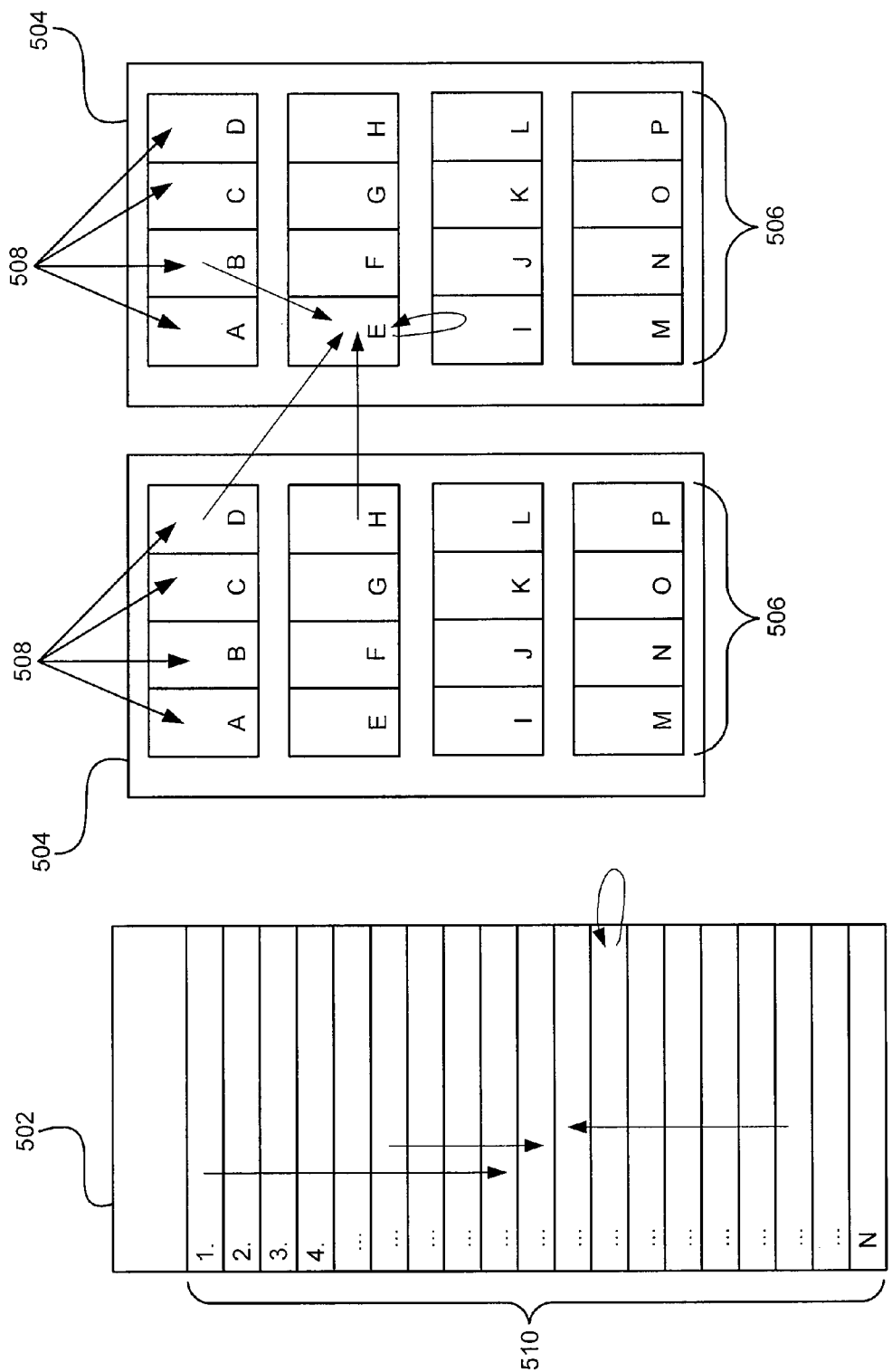

Moreover, payload data within one or more logical pages corresponding to entries 510 in PEB table 502 may be moved between, across, and/or within multiple flash chips 504. In this manner, data transfer rates may be improved as multiple flash chips 504 are accessed simultaneously. With reference now to FIG. 8 and in an exemplary embodiment, the contents of two logical pages located within a first flash chip 504 are moved to a new physical page 508 E located on a second flash chip 504. The content of a logical page located within physical page 508 B on the second flash chip 504 is also moved to physical page 508 E on the second flash chip 504. Moreover, the contents of one logical page located within physical page 508 B are not changed. As before, corresponding updates are made to entries 510 within PEB table 502 in order to reflect the new locations of the payload data.

As illustrated in FIGS. 5-8, in various exemplary embodiments, one or more entries 510 in PEB 502 may be associated with a particular physical page 508. PEB 502 may be configured to support multiple flash chips 504 of different configurations, speeds, capacities, and the like, in order to allow a flash chip array 110 to be constructed from mismatched components and/or in a more cost-effective manner. For example, the number of entries 510 in PEB 502 associated with a first physical page 508 on a first flash chip 504 may differ from the number of entries 510 in PEB 502 associated with a second physical page 508 on a second flash chip 504. In this manner, a uniform logical page size may be utilized within a flash chip array 110 comprised of flash chips 504 of differing physical page sizes. Moreover, in other exemplary embodiments, the number of entries 510 in PEB 502 associated with a first physical page 508 may differ from the number of entries 510 in PEB 502 associated with a second physical page 508 on the same flash chip 504, for example in response to an unusable physical page 508 and/or the like. Thus, because the number of and/or nature of entries 510 in PEB 502 associated with a particular physical page 508 may be varied as desired, payload data storage and retrieval and the associated data transfer rates may thus be improved and/or simplified, particularly for data transfers of less than one physical page in size.

Principles of the present disclosure may suitably be combined with principles of bad page tracking as disclosed in a co-pending U.S. patent application entitled "FLASH MANAGEMENT USING BAD PAGE TRACKING AND HIGH DEFECT FLASH MEMORY" having the same filing date as the present application, the contents of which are hereby incorporated by reference in their entirety.

Principles of the present disclosure may also suitably be combined with principles of separate metadata storage as disclosed in a co-pending U.S. patent application entitled "FLASH MANAGEMENT USING SEPARATE METADATA STORAGE" having the same filing date as the present application, the contents of which are hereby incorporated by reference in their entirety.

Moreover, principles of the present disclosure may suitably be combined with any number of principles disclosed in any one of and/or all of the co-pending U.S. patent applications incorporated by reference herein. Thus, for example, a combination of memory management techniques can include use of a logical page size different from a physical page size, use of separate metadata storage, use of bad page tracking, use of sequential write techniques and/or use of circular leveling techniques.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method of operation of flash memory system, comprising:
constructing a data table associated with a flash memory, wherein entries of the data table correspond to logical pages within the memory, and wherein the size of the logical pages is smaller than a size of a physical page in the memory;
updating the data table responsive to payload data being stored in at least one logical page within the flash memory, wherein the payload data is written to the flash memory in the order it was received from a host; and
storing error detection information in an erase block of the flash memory different from the erase block to store the payload data.

2. The method of claim 1, wherein writing the payload data in the order it was received further comprises writing the payload data in a sequential manner within the at least one erase block in the flash memory.

3. The method of claim 2, wherein the contents of the data table reflect that there is no ordinal relationship among pages in the erase block in the flash memory.

4. The method of claim 1, wherein the flash memory comprises at least two flash chips, and wherein the data table comprises information configured to map consecutive pages of incoming the payload data to different flash chips.

5. The method of claim 1, wherein the data table comprises a bitfield indicating if a logical page is obsolete.

6. The method of claim 1, wherein the data table comprises information configured to prevent the at least one erase block in the flash memory from being used to store the payload data.

7. The method of claim 1, wherein the data table is stored entirely in a random access memory.

8. The method of claim 1, further comprising storing, in the erase block in the flash memory, error correcting information associated with the payload data written to a different erase block in the flash memory.

9. The method of claim 1, wherein the data table is constructed responsive to the flash memory being powered on.

10. The method of claim 1, wherein the data table comprises information configured to map consecutive logical pages of incoming the payload data to different flash chips.

11. The method of claim 10, wherein the flash memory comprises at least two flash memory chips having different storage capacities.

12. A data storage system, comprising:
a memory configured for block-based erase operations and for storing error detection information in an erase block different from the erase block to store the payload data;
a controller in communication with the memory, wherein the controller is configured to write incoming data to the memory in the order the data is received; and
a random access memory, having data table, in communication with the controller, wherein entries of the data table correspond to logical pages within the memory, and wherein the size of the logical pages is smaller than a size of a physical page in the memory.

13. The data storage system of claim 12, wherein the size of the logical pages is smaller than the size of any physical page in the memory.

14. The data storage system of claim 12, wherein the controller comprises a buffer-host machine, a media-buffer machine, a data buffer, a local buffer, and a sequence and control machine.

15. The data storage system of claim 14, wherein the controller is configured to write incoming the payload data in a sequential manner within the erase block in the memory.

16. The data storage system of claim 15, wherein the memory is a flash memory.

* * * * *